United States Patent
Gellert

[11] Patent Number: 6,099,780
[45] Date of Patent: Aug. 8, 2000

[54] METHOD OF THREE LAYER INJECTION MOLDING WITH SEQUENTIAL AND SIMULTANEOUS COINJECTION

[76] Inventor: Jobst Ulrich Gellert, 7A Prince Street, Georgetown, Ontario, Canada, L7G 2X1

[21] Appl. No.: 09/204,246

[22] Filed: Dec. 3, 1998

[30] Foreign Application Priority Data

Nov. 5, 1998 [CA] Canada ................................. 2253042

[51] Int. Cl.⁷ ........................... B29C 45/16; B29C 45/22
[52] U.S. Cl. ....................................... 264/255; 264/328.8
[58] Field of Search .......................... 264/255, 328.7, 264/328.8, 328.1; 425/130, 129.1

[56] References Cited

U.S. PATENT DOCUMENTS

| | | | |
|---|---|---|---|
| 4,052,497 | 10/1977 | Monnet | 264/255 |
| 4,174,413 | 11/1979 | Yasuike et al. | 428/35 |
| 4,717,324 | 1/1988 | Schad et al. | |
| 4,978,493 | 12/1990 | Kersemakers et al. | 264/255 |
| 5,221,507 | 6/1993 | Beck et al. | 264/328.8 |
| 5,374,178 | 12/1994 | Nakayama . | |
| 5,891,381 | 4/1999 | Bemis et al. | 264/328.8 |

OTHER PUBLICATIONS

Canadian Patent Application No. 2,201,415 to Schramm et al. laid open Oct. 4, 1997.

*Primary Examiner*—Angela Ortiz
*Attorney, Agent, or Firm*—Dalesman & Company

[57] ABSTRACT

A method of multi-cavity valve gated three layer injection molding to form containers or preforms having a middle layer of a barrier material between inner and outer layers of a PET type material. The barrier material is injected through an annular channel in each heated nozzle simultaneously with the PET type material being injected through a central melt bore in each valve pin. This reduces cycle time and produces a thicker inner layer of PET.

8 Claims, 5 Drawing Sheets

METHOD OF THREE LAYER INJECTION MOLDING WITH SEQUENTIAL AND SIMULTANEOUS COINJECTION

BACKGROUND OF THE INVENTION

This invention relates generally to a method of valve gated three layer injection molding and more particularly to such a method wherein the material which forms the outer layers is injected through a valve pin and the material which makes up the inner barrier layer is injected through an annular channel in the nozzle with part of the injection of both of the materials being simultaneous.

Multi-cavity injection molding apparatus for making three layer protective containers for food or preforms or parisons for beverage bottles are known. A middle layer of a barrier material such as ethylene vinyl alcohol copolymer (EVOH) or nylon is molded between inner and outer layers of a polyethylene terephthalate (PET) type material. In some cases, the two melts are injected sequentially, while in other cases both sequential injection and simultaneous coinjection are utilized. A disadvantage of these previous methods is that the middle layer of barrier material is midway between the inner and outer layers of PET. This can result in the middle layer of the barrier material cracking when a hot liquid is poured into the container.

While most of the prior art shows the barrier material being injected through a central melt channel in each heated nozzle, U.S. Pat. No. 4,717,324 to Schad et al. which issued Jan. 5, 1988 shows valve gated three layer injection molding with the PET type material being injected through the central melt channel in each nozzle. Canadian Patent Application No. 2,201,415 to Blank et al. laid open Oct. 4, 1997 also shows the PET type material being injected through a central melt bore in each valve pin. U.S. Pat. No. 5,374,178 to Nakayama which issued Dec. 20, 1994 also shows melt being injected through a central melt bore in the valve pin. However, these previous valve gated methods have the disadvantages that the two materials are injected sequentially which limits further reductions in cycle time and also produces a thin outer layer of PET.

SUMMARY OF THE INVENTION

Accordingly, it is an object of the present invention to at least partially overcome the disadvantages of the prior art by providing a method of valve gated three layer injection molding wherein the PET type material is injected through the central melt bore in each valve pin and which has both sequential and simultaneous coinjection of the two materials.

To this end, in one of its aspects, the invention provides a method of continuously injection molding three layer products in a multi-cavity injection molding apparatus having a front melt distribution manifold spaced from a rear distribution manifold by melt transfer bushings with a plurality of heated nozzles mounted in a mold. Each heated nozzle has a rear end abutting against the front melt distribution manifold and a front end adjacent a gate leading to a cavity in the mold. Each heated nozzle also has a central channel extending therethrough from the rear end to the front end and an annular melt channel extending around the central channel to the front end. An elongated valve pin extends in the central channel in each heated nozzle in alignment with a gate leading to a cavity in the mold. The central channel has a rear portion and a smaller diameter front portion which fits around the valve pin. Each valve pin has a rear end, a front end, an outer surface, a central melt bore, and one or more lateral melt bores. The central melt bore extends a set distance rearwardly from the front end of the valve pin to a rear end of the central melt bore. The lateral melt bores extend outwardly from the central melt bore to the outer surface of the valve pin. Valve pin actuating mechanism reciprocates each valve pin between a retracted fully open position and a forward partially open position wherein the front end of the valve pin is seated adjacent the aligned gate to block melt flow through the annular melt channel.

With the valve pins in the forward partially open position, a first molten material from a first melt source is injected into the cavities through a first melt passage which branches in the rear melt distribution manifold and extends through passages in the melt transfer bushings and along the valve pins through bores through the front melt distribution manifold and the rear portions of the aligned central channels through the heated nozzles, and through the at least one lateral bore and the central melt bore in each of the elongated valve pins, and through the aligned gates into the cavities. After a predetermined quantity of the first molten material has been injected into the cavities, the valve pins are retracted to the fully open position and a second molten material from a second melt source is simultaneously coinjected into the cavities through a second melt passage which branches in the front melt distribution manifold and extends through the annular channel in each heated nozzle and through the aligned gates. This forms a middle layer of the second material between an inner and an outer layer of the first material in each of the cavities. When the cavities are nearly full, the valve pins are returned to the partially open position to discontinue the injection of the second material through the second melt passage, while continuing the injection of the first material through the first melt passage until the cavities are full and packed. After decompressing the first material and a cooling period, the mold is opened and the molded products are ejected, and the mold is then closed again.

Further objects and advantages of the invention will appear from the following description taken together with the accompanying drawings.

DETAILED DESCRIPTION OF THE INVENTION

Figure 1:
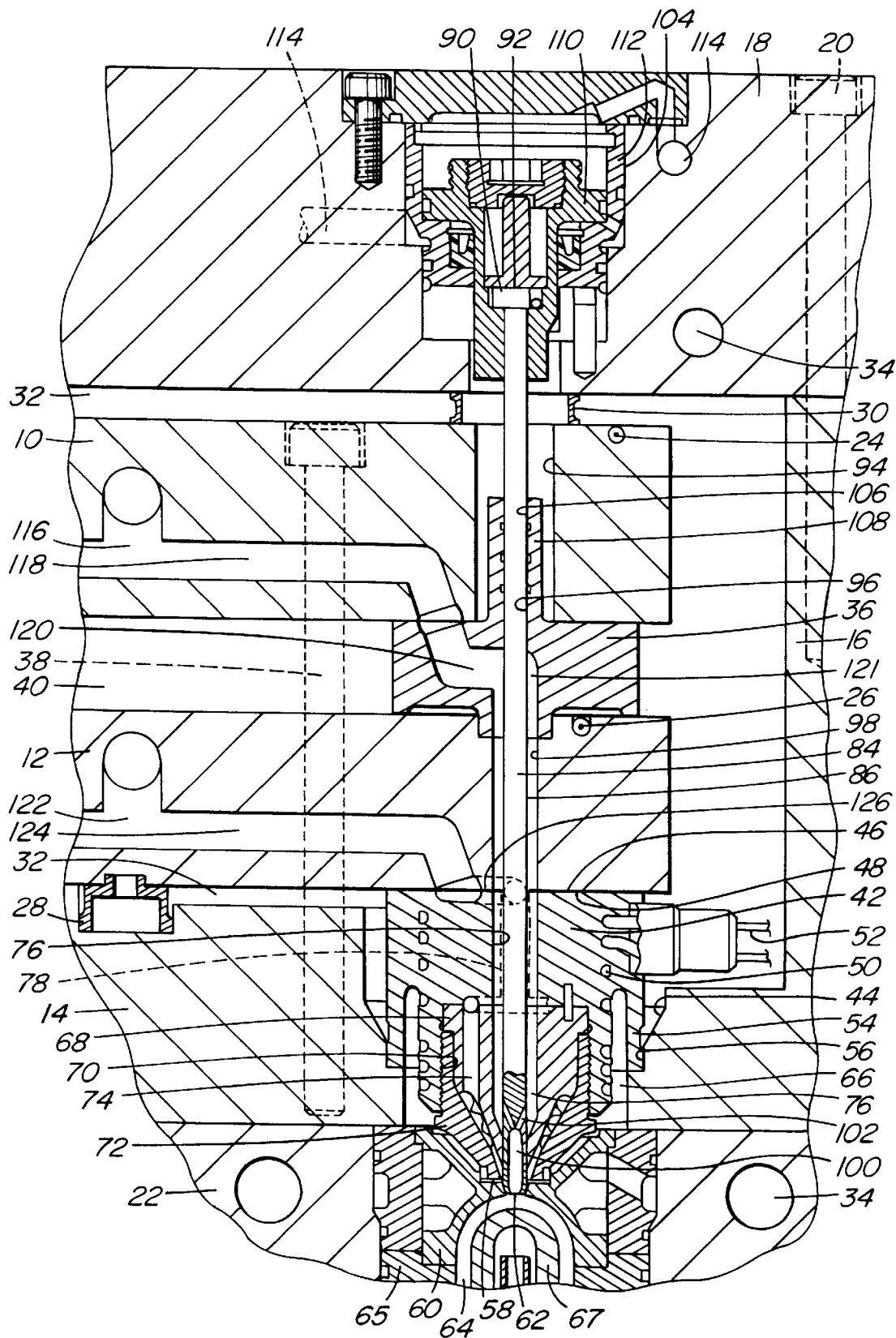
FIG. 1 is a sectional view of a multi-cavity valve gated injection molding apparatus or system to operate according to a preferred embodiment of the invention.

Reference is first made to FIG. 1 which shows a portion of multi-cavity injection molding apparatus used in a method of continuously injection molding three layer containers, preforms or other products by a combination of sequential and simultaneous coinjection according to a preferred embodiment of the invention.

A rear melt distribution manifold 10 and a front melt distribution manifold 12 are mounted in a mold 14. While the mold 14 can have a greater number of plates depending upon the application, in this case only a manifold retainer plate 16 and a back plate 18 secured together by bolts 20, as well as a cavity retainer plate 22, are shown for ease of illustration. The melt distribution manifolds 10, 12 are heated by integral electrical heating elements 24, 26. They are secured in place by a central locating ring 28 and a number of spacer rings 30 extending between the rear melt distribution manifold 10 and the back plate 18 to provide insulative air spaces 32 extending between them and the surrounding mold 14 which is cooled by pumping cooling water through cooling conduits 34. As can be seen, the two melt distribution manifolds 10, 12 are separated by thermal insulating melt transfer valve bushings 36 mounted between them and secured together by screws 38 extending from the rear melt distribution manifold 10 into the front melt distribution manifold 12. In operation, the rear melt distribution manifold 10 is heated by the integral electrical heating element 24 to a higher operating temperature than the front melt distribution manifold 12, and the insulative air space 40 between them provided by the thermal insulating melt transfer valve bushing 36 maintains this thermal separation between the two manifolds 10, 12.

Each heated nozzle 42 is seated in an opening 44 in the manifold retainer plate 16 with its rear end 46 abutting against the front face 48 of the front melt distribution manifold 12. The nozzle 42 is heated by an integral electrical heating element 50 having a terminal 52. A rear collar portion 54 of the heated nozzle 42 is received in a circular locating seat 56 extending around the opening 44. This aligns the front end 58 of the nozzle 42, which extends into a mold gate insert 60, with a gate 62 extending through the gate insert 60 to a cavity 64. This cavity 64 for making beverage bottle preforms extends between a cavity insert 65 and a mold core 67 in a conventional manner. This also provides an insulative air space 66 between the heated nozzle 42 and the surrounding cooled mold 14. In the configuration shown, each heated nozzle 42 has an insert portion 68 which is secured in a seat 70 by a threaded nozzle seal 72 which is screwed into place and forms the front end 58 of the heated nozzle 42. As can be seen, the insert portion 68 is made to provide an annular melt channel 74 extending around a central channel 76 to the front end 58. The central channel 76 extends from the rear end 46 of the nozzle 42, while the surrounding annular melt channel 74 extends from two melt bores 78, spaced on opposite sides of the central melt channel 76 and running to the rear end 46 of the nozzle 42.

Figure 2:
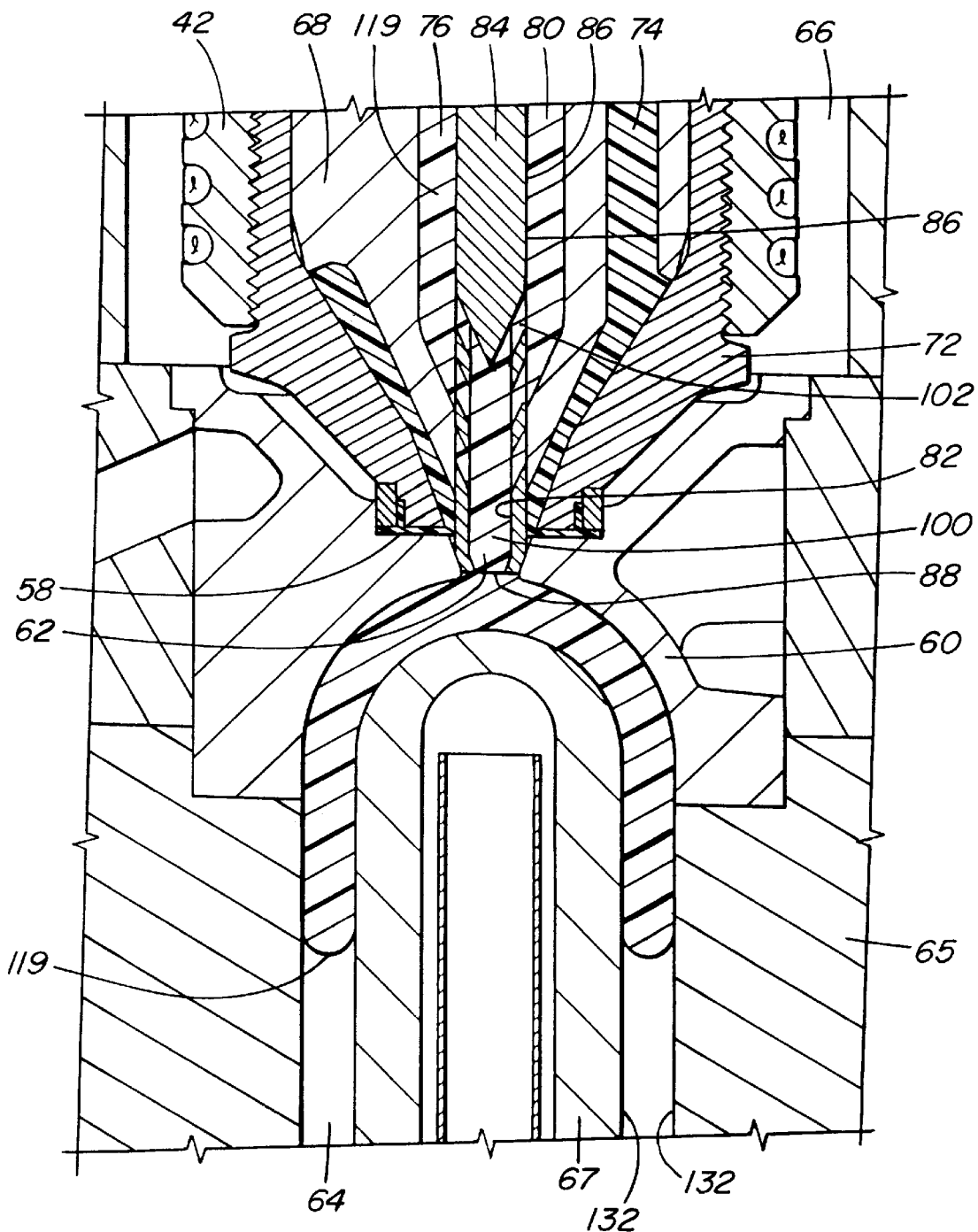
FIG. 2 is an enlarged section of a portion of FIG. 1 showing the flow of the first material through a central melt bore in the front end of the valve pin.

As also seen in FIG. 2, the central channel 76 extending through the heated nozzle 42 has a rear portion 80 and a smaller diameter front portion 82 which fits around an elongated valve pin 84. The valve pin 84 has a cylindrical outer surface 86, a front end 88 and an enlarged head 90 at its rear end 92. Each valve pin 84 extends through an opening 94 in the rear melt distribution manifold 10, a central bore 96 through the melt transfer valve bushing 36, an aligned bore 98 in the front melt distribution manifold 12, and the aligned central channel 76 through one of the heated nozzles 42 with its front end 88 aligned with one of the gates 62. Each valve pin 84 also has a central melt bore 100 extending rearwardly from its front end 88 and several lateral melt bores 102 extending diagonally outward from the central melt bore 100 to the outer surface 86 of the valve pin 84. The elongated valve pin 84 is reciprocated according to a predetermined injection cycle by pneumatic actuating mechanism 104 seated in the back plate 18. The valve pin 84 fits in a rear portion 106 of the central bore 96 through the melt transfer valve bushing 36 tightly enough to prevent melt leakage around the valve pin 84 as it reciprocates. The melt transfer bushing 36 has a neck portion 108 which extends rearwardly into the opening 94 in the rear melt distribution manifold 10 to lengthen the seal around the valve pin 84.

The head 90 of the valve pin 84 is connected to a piston 110 seated in a cylinder 112 in the back or cylinder plate 18. The piston is driven by controlled air pressure applied through ducts 114 to reciprocate the valve pin 84 according to the injection cycle between a forward partially open position shown in FIG. 2 in which the front end 88 of the valve pin 84 is seated in the gate 62 and a retracted fully open position shown in FIG. 3.

A first melt passage 116 connected to a pressurized source (not shown) of a first melt branches in the rear melt distribution manifold 10. The first melt is normally polyethylene terephthalate (PET), but can be a combination of PET and PEN (polyethylene naphthalate) or other similar types of material. Each branch 118 extends through a conduit 120 in the melt transfer valve bushing 36 and along the valve pin 84 through the aligned bore 98 through the front melt distribution manifold 12 and into the aligned central channel 76 in one of the heated nozzles 42. The conduit 120 in the melt transfer valve bushing 36 bends to join a front portion 121 of the central bore 96 through the melt transfer valve bushing 36 where the melt flows along the valve pin 84. As best seen in FIG. 2, each branch 118 of the first melt passage 116 continues so the first melt 119 flows from the rear portion 80 of the central channel 76 diagonally inwardly through the lateral melt bores 102 into the central melt channel 100 in the valve pin 84 and then through the aligned gate 62 into the cavity 64.

Figure 3:
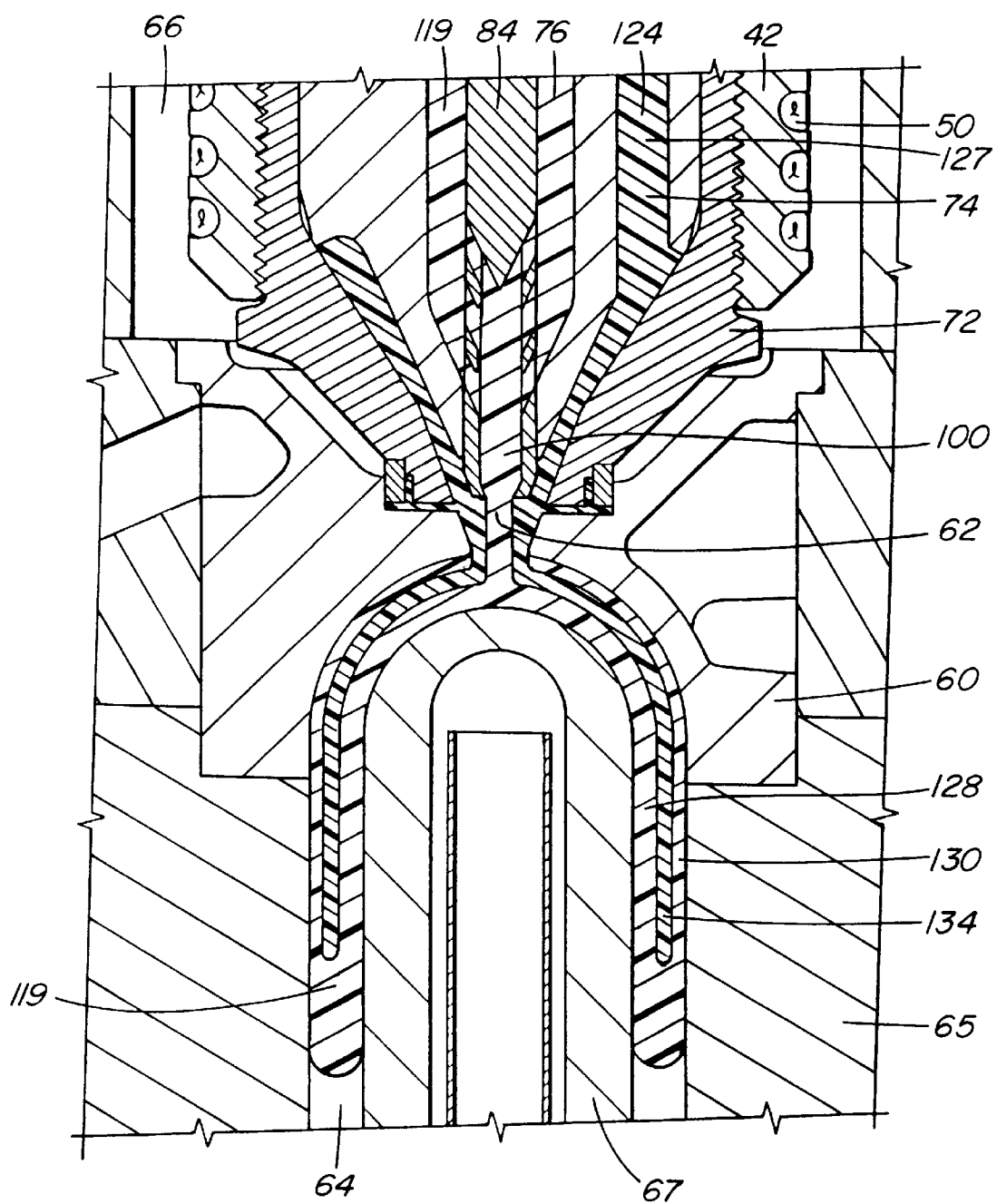
FIG. 3 is a similar view showing the valve pin retracted to allow simultaneous injection of both the first and second materials.

A second melt passage 122 connected to a pressurized source (not shown) of a second melt of a barrier material such as ethylene vinyl alcohol copolymer (EVOH) or nylon branches in the front melt distribution manifold 12. Each branch 124 splits at the interface 126 between the front face 48 of the front melt distribution manifold 12 and the rear end 46 of the nozzle 42 and extends to the two melt bores 78 extending forwardly in the aligned heated nozzle 48 to the annular melt channel 74. As best seen in FIG. 3, when the valve pin 84 is retracted to the fully open position, the second melt passage 122 also extends through the aligned gate 62 and into the cavity 64.

In use, the injection molding system is assembled as shown in FIG. 1 and operates to form three layer preforms or other products according to a preferred embodiment of the invention as follows. Electrical power is applied to the heating element 24 in the rear melt distribution manifold 10 and the heating elements 50 in the nozzles 42 to heat them to an operating temperature of about 565° F. Electrical power is also applied to the heating element 26 in the front melt distribution manifold 12 to heat it to an operating temperature to about 400° F. Water is applied to the cooling conduits 34 to cool the mold 14 and the gate inserts 60. During each injection cycle, with the valve pins 84 in the forward partially open position, a predetermined quantity of the PET type material 119 is injected through the first melt passage 116 into the cavities 64 wherein an inner layer 128 and an outer layer 130 adhere to the sides 132 of each cavity 64. After a predetermined quantity of the PET has been injected into the cavities 64, the actuating mechanism 104 retracts the valve pins 84 to the fully open position shown in FIG. 3 and the less viscous barrier material 127 is then simultaneously coinjected through the second melt passage 122 into the cavities 64.

Figure 4:
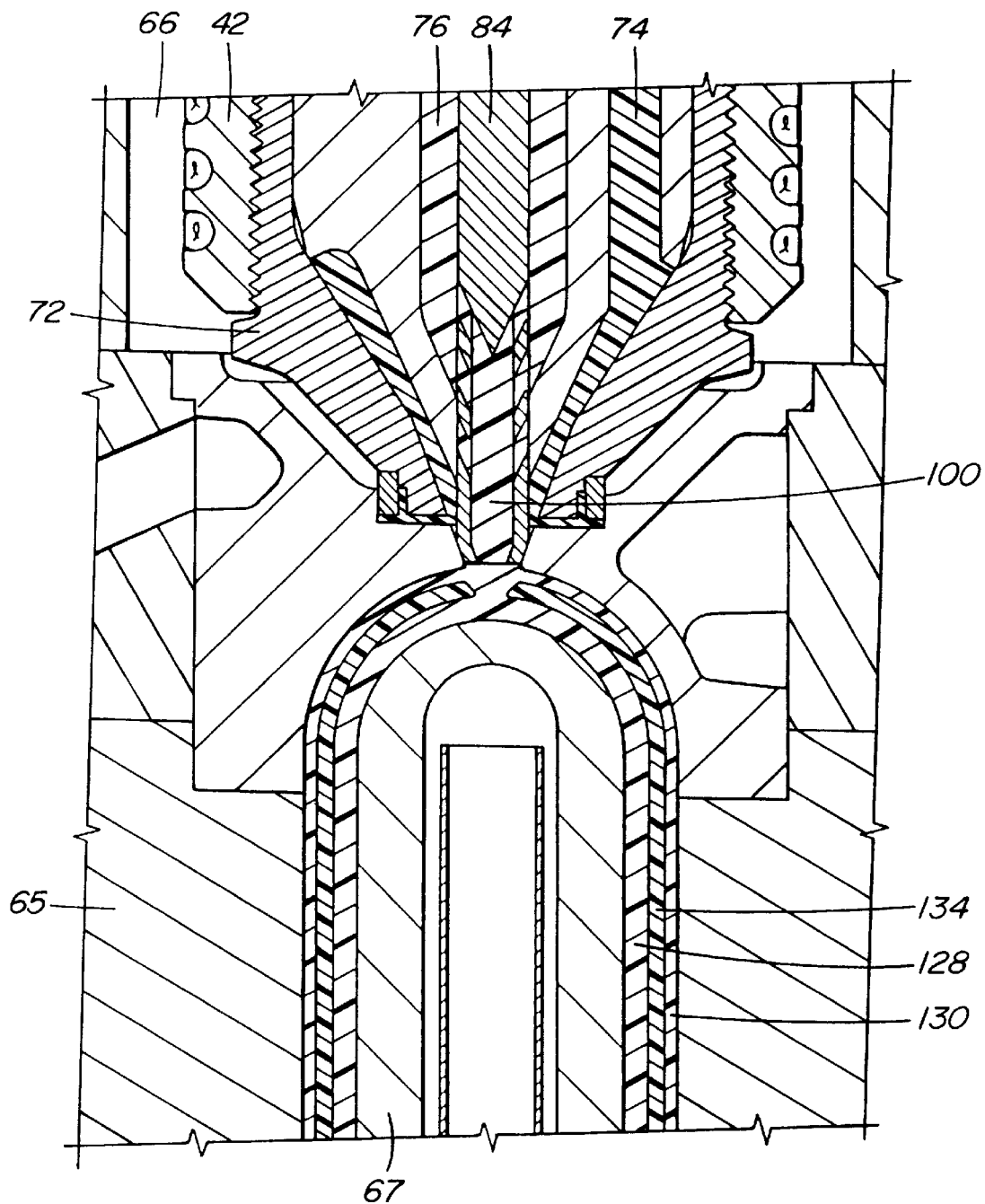
FIG. 4 is a similar view showing the valve pin returned to the partially open position to block the flow of the second material.
Figure 5:
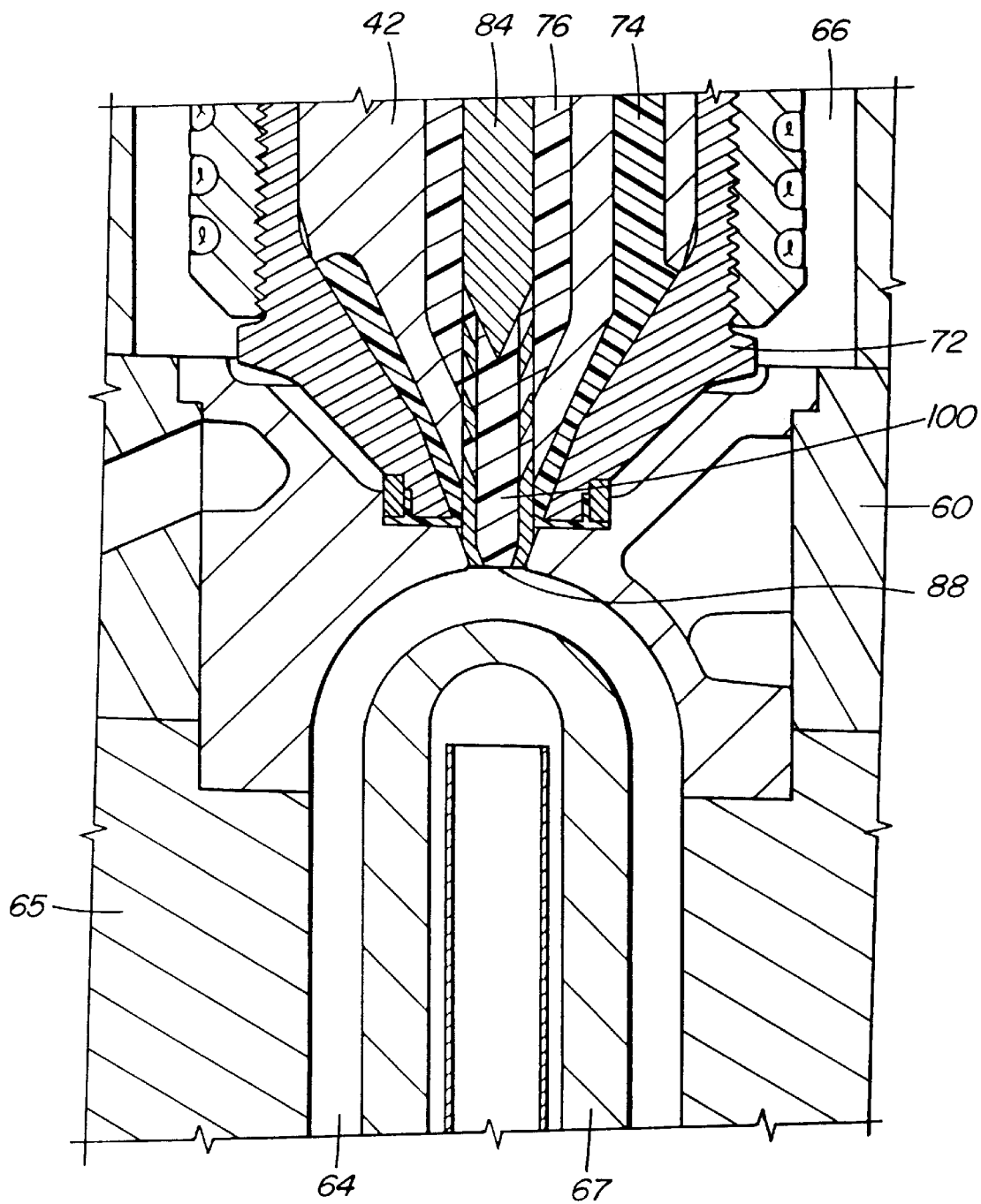
FIG. 5 is a similar sectional view after ejection of the molded product.

This method of simultaneously coinjecting the barrier material around the PET produces a middle layer 134 of the barrier material between the inner and outer layers 128, 130 of PET, with the inner layer 128 being substantially thicker than the outer layer 130. The outer layer 130 of PET being thicker provides increase protection against cracking of the middle layer 134 of the barrier material when a hot liquid is poured into the container. When the cavities 64 are nearly full, the actuating mechanisms 104 return the valve pins 84 to the partially open position shown in FIG. 4 which discontinues the injection of the barrier material through the second melt passage 122, while the injection of the PET through the first melt passage 116 continues until the cavities 64 are full. Injection pressure of the PET is then released and, after a short cooling period, the mold 14 is opened for ejection. After ejection, the mold 14 is closed again as shown in FIG. 5 and the cycle is repeated continuously every 15 to 30 seconds with the frequency depending upon the wall thickness and number and size of cavities 64 and the exact materials being molded.

While the description of the method of injection molding three layer products with both sequential and simultaneous coinjection of two materials has been given with respect to a preferred embodiment, it will be evident that various other modifications are possible without departing from the scope of the invention as understood by those skilled in the art and as defined in the following claims. For instance, materials having suitable characteristics can be used rather than PET and EVOH or nylon.

What is claimed is:

1. A method of injection molding multi-layer products in a multi-cavity injection molding apparatus having a front melt distribution manifold spaced from a rear distribution manifold by melt transfer bushings with a plurality of heated nozzles each mounted in a mold, between the front melt distribution manifold and a gate leading to a cavity in the mold, each heated nozzle having a central channel extending therethrough and an annular me lt channel extending around the central channel, an elongated valve pin extending in the central channel in each heated nozzle in alignment with a gate leading to a cavity in the mold, and valve pin actuating mechanism to reciprocate each valve pin between a retracted fully open position and a forward partially open position wherein the front end of the valve pin is seated adjacent the aligned gate to block melt flow through the annular melt channel, comprising the steps of;

(a) with the valve pins in the forward partially open position, injecting a first molten material from a first melt source into the cavities through a first melt passage which branches in the rear melt distribution manifold and extends through passages in the melt transfer bushings and along the valve pins through bores through the front melt distribution manifold and the central channels through the heated nozzles, and through the aligned gates into the cavities, (b) after a predetermined quantity of the first molten material has been injected into the cavities, retracting the valve pins to the fully open position and simultaneously coinjecting a second molten material from a second melt source into the cavities through a second melt passage which branches in the front melt distribution manifold and extends through the annular channel in each heated nozzle and through the aligned gates whereby the second molten material forms a middle layer between inner and outer layers of the first material in each of the cavities, (c) when the cavities are nearly full, returning the valve pins to the partially open position to discontinue the injection of the second material through the second melt passage, while continuing the injection of the first material through the first melt passage until the cavities are full, (d) after decompressing the first material and a cooling period, opening the mold and ejecting the molded products, and (e) closing the mold after ejection of the molded products.

2. A method of injection molding as clamed in claim 1 wherein the at one lateral melt bore in each pin extends diagonally from the central melt bore to the outer surface of the elongated pin.

3. A method of injection molding as claimed in claim 2 wherein the first material is polyethylene terephthalate (PET).

4. A method of injection molding as claimed in claim 3 wherein the second material is ethylene vinyl alcohol copolymer (EVOH).

5. A method of injection molding as claimed in claim 3 wherein the second material is nylon.

6. A method of injection molding as claimed in claim 1 wherein the central channel in each heated nozzle has a rear portion and a smaller diameter front portion which fits around the valve pin and each valve pin has a front end, an outer surface, a central melt bore, and at least one lateral melt bore, the central melt bore extending a predetermined distance rearwardly from the front end of the valve pin, the at least one lateral melt bore extending outwardly from a rear end of the central melt bore to the outer surface of the valve pin, and the first melt passage extends through the rear portions of the central channels through the heated nozzles and through the at least one lateral bore and the central melt bore in each of the elongated valve pins.

7. A method of continuously injection molding three layer products in apparatus having at least one heated nozzle mounted in a mold, each heated nozzle having an elongated valve pin extending therethrough in alignment with a gate leading to a cavity in the mold, including the steps of;

(a) with the valve pin in a forward partially open position, injecting a first molten material from a first melt source into the cavity through a first melt passage which extends through a central channel in each heated nozzle and through the aligned gate into the cavity, and (b) after a predetermined quantity of the first molten material has been injected into the cavities, retracting the valve pin to a fully open position and simultaneously coinjecting a second molten material from a second melt source into the cavity through a second melt passage which extends through an annular channel in each heated nozzle to the gate, whereby the second molten material forms a middle layer between inner and outer layers of the first material in each of the cavities.

8. A method of injection molding a multi-layer article made of a first molten material and of a second molten material comprising the steps of:

(a) injecting said first molten material into a cavity through a movable valve pin, with said valve pin is in a first position that obstructs access of the second molten material to the cavity, (b) moving said valve pin into a second position and injecting said second material into said mold cavity space, while continuing to inject said first material through said valve pin until the cavity is filled with said first and second materials, and (c) moving said valve pin back in said first position to obstruct the flow of the second material, reducing the injection pressure upon the first material and cooling the molded article.

* * * * *